United States Patent [19]

Kawano et al.

[11] Patent Number: 5,721,821
[45] Date of Patent: Feb. 24, 1998

[54] INFORMATION PROCESSING SYSTEM HAVING RING FASHIONED BUS CONNECTION

[75] Inventors: Kayoko Kawano; Satoshi Sugiura; Yasushi Takaki, all of Kawasaki, Japan

[73] Assignee: Fujitsu Limited, Kawasaki, Japan

[21] Appl. No.: 654,787

[22] Filed: May 28, 1996

Related U.S. Application Data

[63] Continuation of Ser. No. 248,252, May 24, 1994, abandoned.

[30] Foreign Application Priority Data

Sep. 20, 1993 [JP] Japan ................................ 5-257584

[51] Int. Cl.[6] ............................................... G06F 15/16
[52] U.S. Cl. ........................ 395/200.15; 395/200.21; 395/287; 395/800
[58] Field of Search ...................... 395/200.15, 200.21, 395/287, 800; 370/851.15

[56] References Cited

U.S. PATENT DOCUMENTS

| | | |
|---|---|---|
| 4,667,287 | 5/1987 | Allen et al. ............................ 395/800 |
| 5,105,424 | 4/1992 | Flaig et al. ............................ 370/94.1 |
| 5,155,858 | 10/1992 | DeBruler et al. ...................... 395/800 |
| 5,179,715 | 1/1993 | Andoh et al. .......................... 395/800 |

FOREIGN PATENT DOCUMENTS 0 166 915  1/1986  European Pat. Off. .
0 330 475  8/1989  European Pat. Off. .

OTHER PUBLICATIONS

IBM Technical Disclosure Bulletin, vol. 33, No. 11, 1 Apr. 1991, pp. 429-434, XP000110460 "Service Processor Data Transfer".

*Primary Examiner*—Jack B. Harvey
*Assistant Examiner*—Jeffrey K. Seto
*Attorney, Agent, or Firm*—Staas & Halsey

[57] ABSTRACT

An information processing system has a plurality of information processing units. Each information processing unit has a system console interface control unit (SCI) connected to an information processing unit body (COM) and a service processor (SVP). The plurality of system console interface control units (SCI) are connected each other in a ring fashion. Each system console interface control unit (SCI) has a processing devcice for processing an interface between the self-service processor (SVP0) and the other-information processing unit body (COM1).

4 Claims, 7 Drawing Sheets

INFORMATION PROCESSING SYSTEM HAVING RING FASHIONED BUS CONNECTION

This application is a continuation, of application Ser. No. 08/248,252, filed on May 24, 1994, now abandoned.

BACKGROUND OF THE INVENTION

1. Field of the Invention

The present invention relates to an information processing system and more particularly, to an information processing system used in a plurality of information processing units.

2. Description of the Related Art

An information processing unit has a plurality of information processing units body and service processors. The following methods are used to allow the plurality of service processors to provide each information processing unit body with a service such as microprogram loading, error processing or the like. This method has a plurality of system interface control units which control interface or clock generation between the service processor and the information processing unit. Each system console interface control unit is connected to at least one of the information processing unit body and the service processor if necessary. Each of the system console interface control units is also bus-connected to each other.

As a method to bus-connect the system console control units, so called "point-to-point method" which connects each of the system console interface control units is generally known.

FIG. 3 shows the connection according to this prior method when the number of the service processor is equal to that of the information processing unit body.

However, if the system console interface control units are connected by "point-to-point method", when the number of the service processor and the information processing unit body is referred by "m", the number of a signal line necessary for the connection is referred by "mC2". This means the connection will be physically difficult if the number of the service processor and the information processing unit increases.

SUMMARY OF THE INVENTION

It is therefore an object of the present invention to provide an information processing system which connects the system console interface control units by fewer signal lines and provides high reliability and transmission efficiency.

It is another object of the present invention to provide an information processing system which processing means is provided to the system console interface control unit SCI so that a connection by a ring fashioned bus is acquired.

It is still another object of the present invention to provide an information processing unit which the system console interface control units can be connected to each other by fewer signal lines.

It is yet another object of the present invention to provide an information processing system which the processing means allows a logical bidirectional access processing, even if the bus of one direction is failed, an access processing is available by bus of other direction, i.e., a transmission reliability is improved.

It is further object of the present invention to provide an information processing system which multiple access is available as long as a transmission line necessary for the access processing is not occupied, even if a plurality of access processing orders are issued, i.e., a transmission efficiency is improved.

Other objects of this invention will become clear as the description procees.

In accordance with this invention, there is provided an information processing system which comprises a plurality of information processing units. One information processing unit comprises an information processing unit body processing predetermined information, a service processor services microprogram loading and error processing for the information processing unit body, processing means for processing interface between the service processor and another information processing unit body and a system console interface control unit connects said information processing unit body with the service processor of the other information processing unit. The system console interface control unit is connected in a ring fashion to the system console interface control unit of the other information processing unit.

Figure 5:
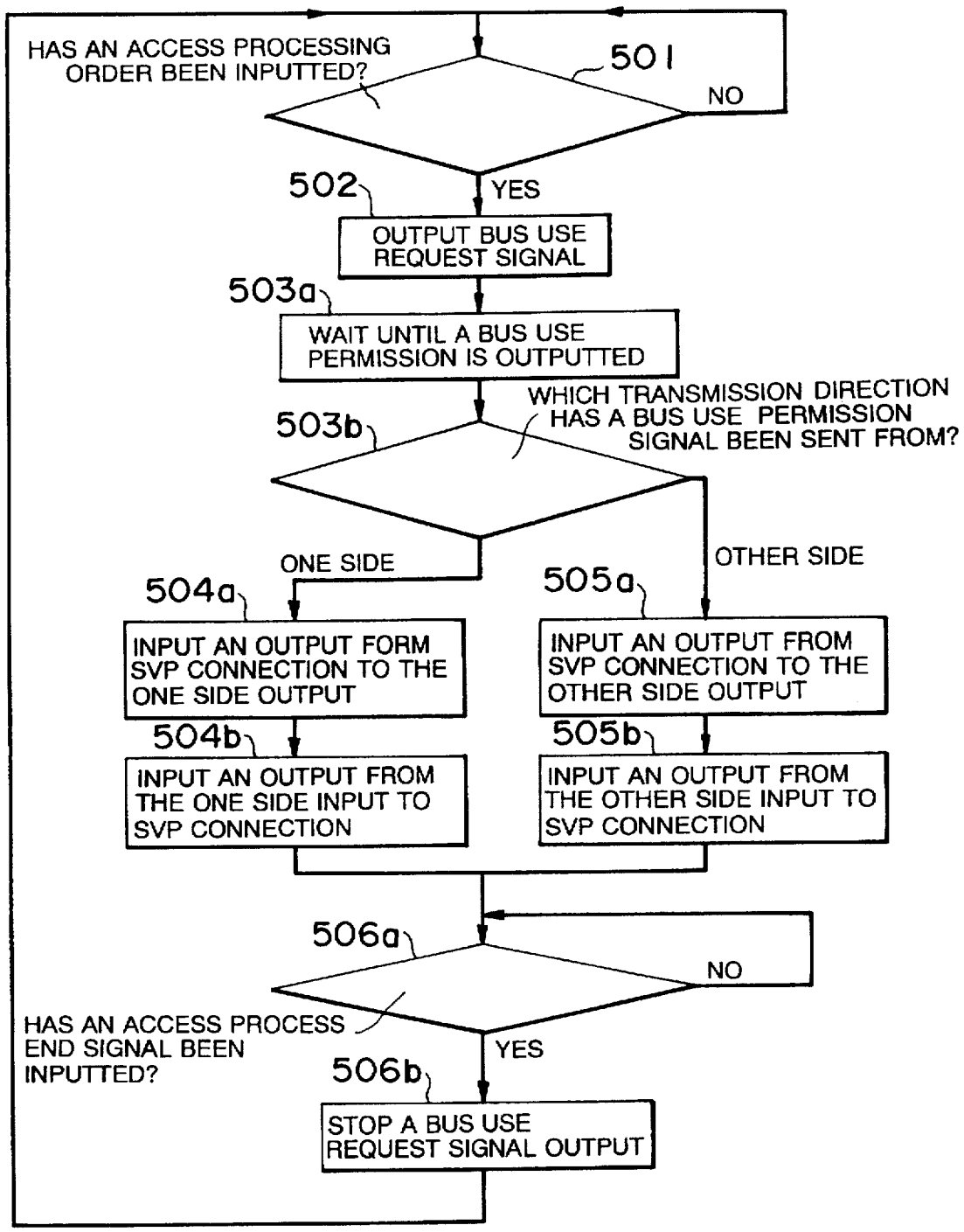
Figure 6:
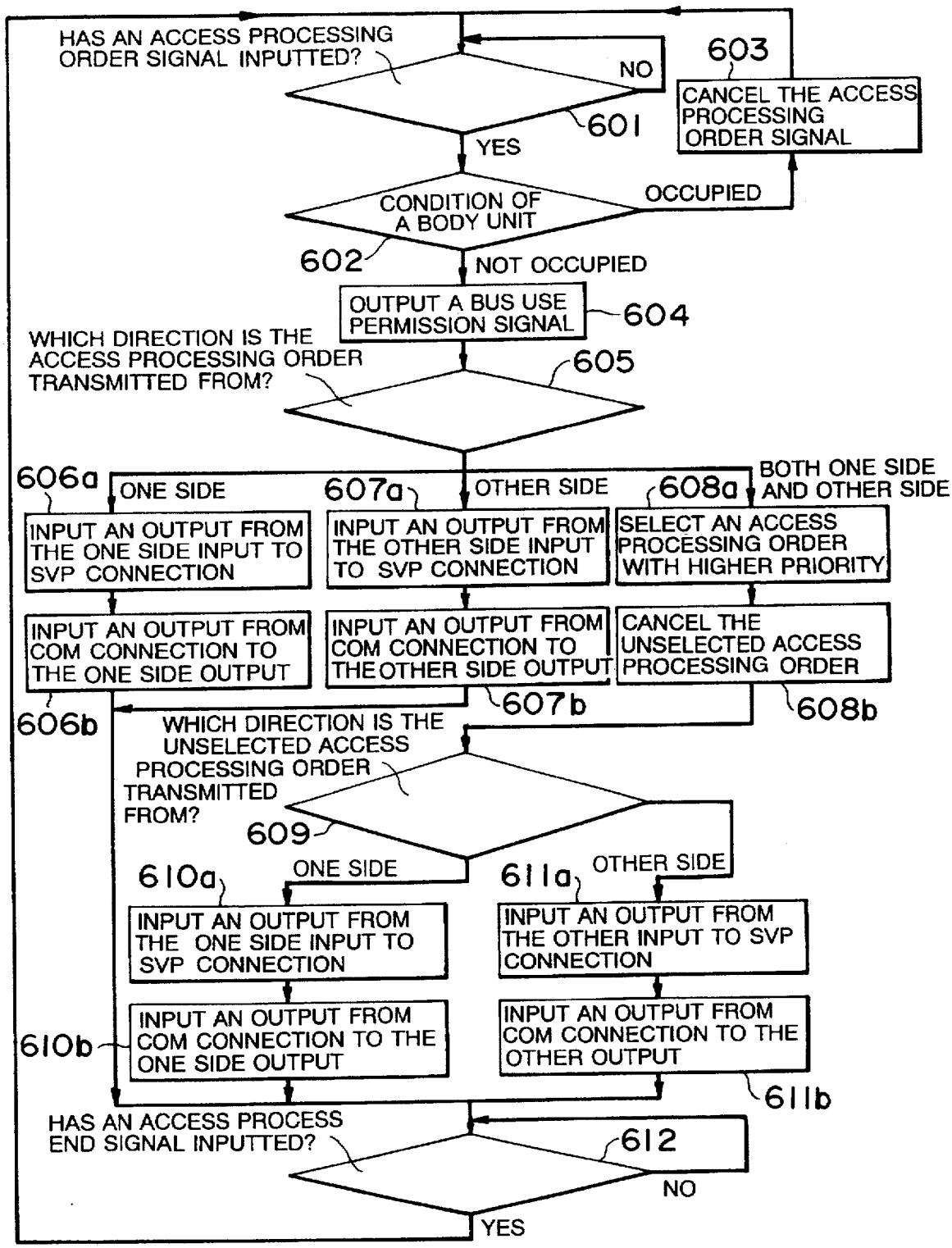
Figure 7:
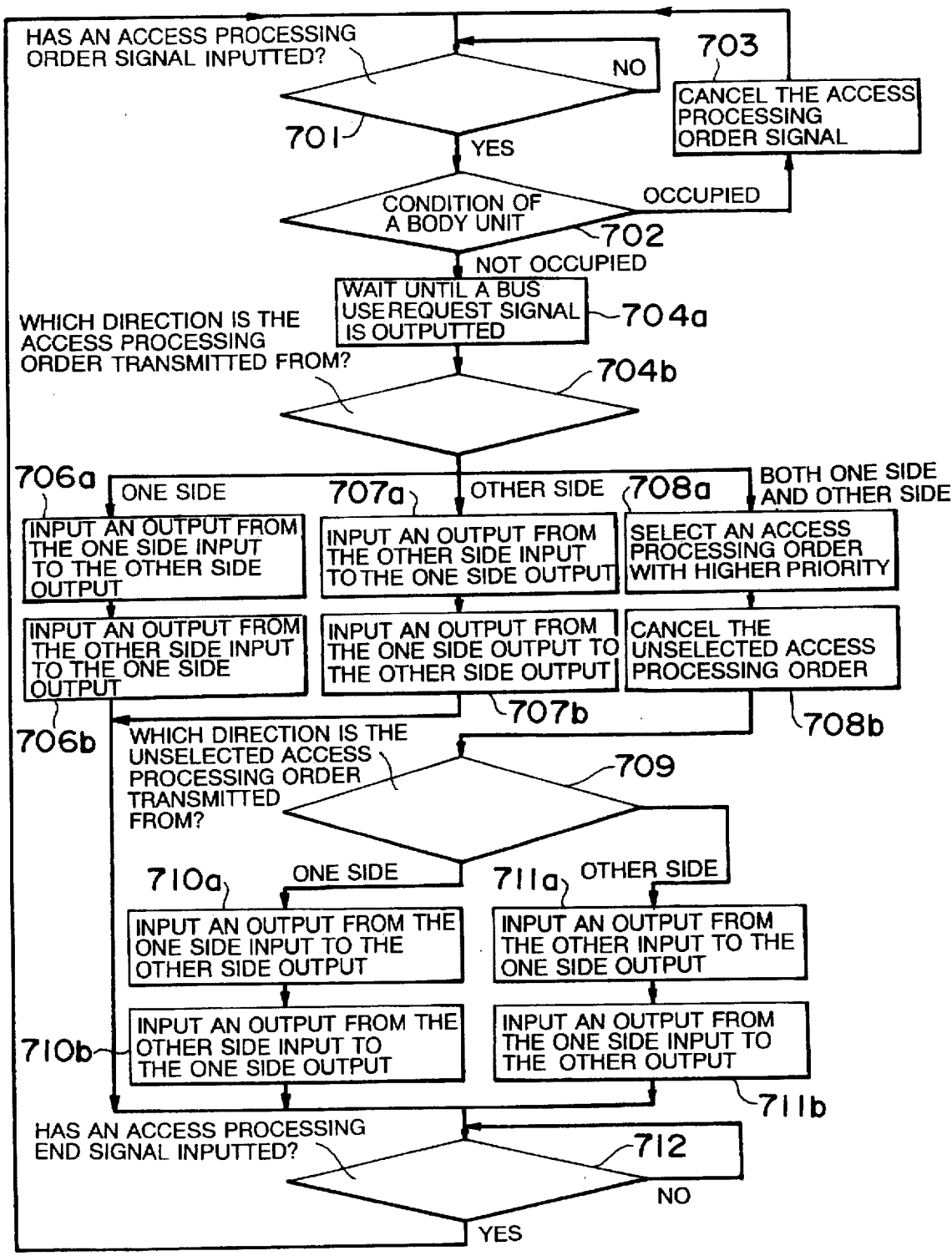

FIGS. (4a) and (4b) are a charts showing one embodiment of the present invention;

FIG. 5 is a flow chart showing an operation of a process output means;

FIG. 6 is a flow chart showing an operation of a process input means;

FIG. 7 is a flow chart showing an operation of a process relay means.

Figure 8:
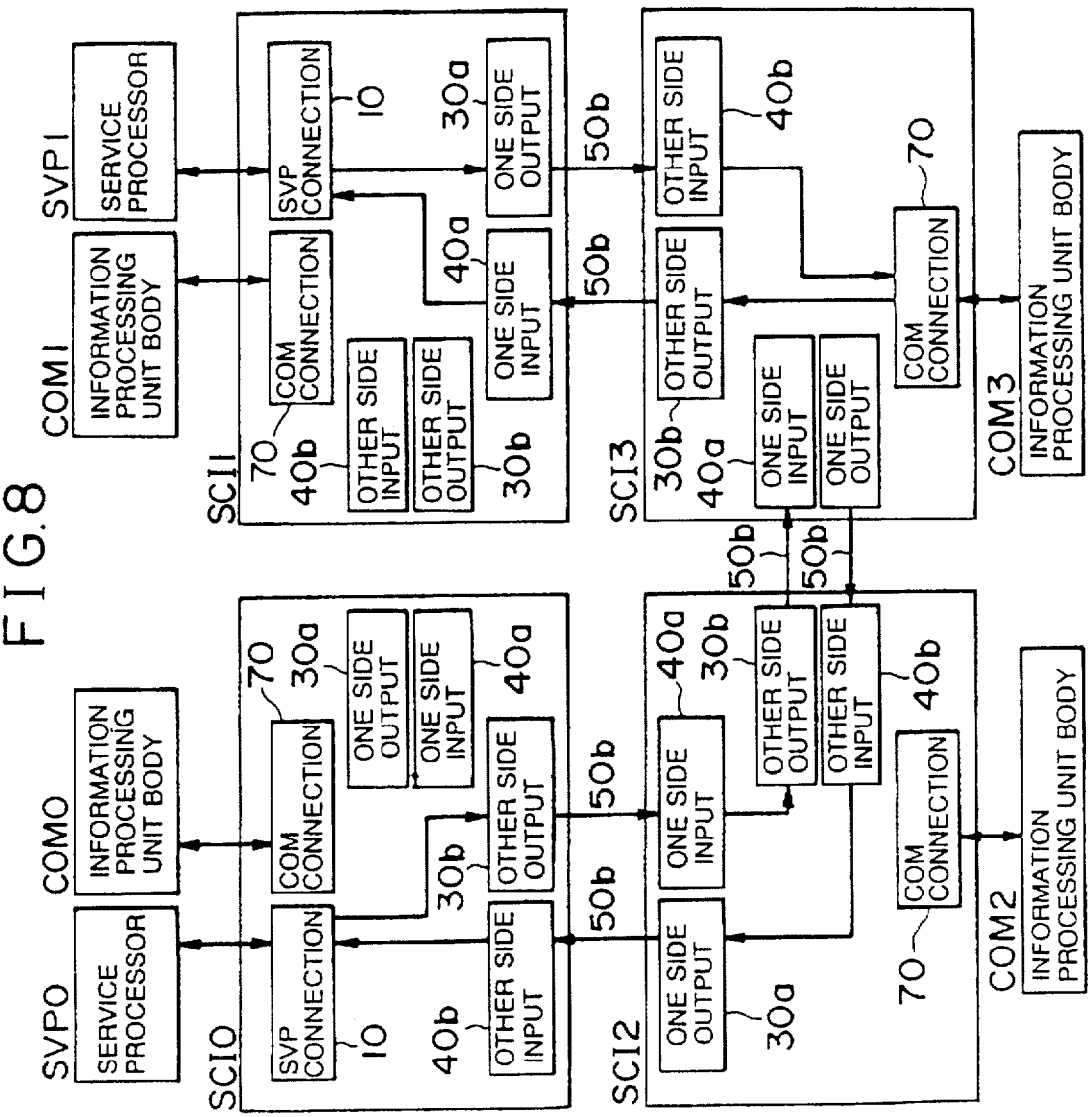
Figure 9:
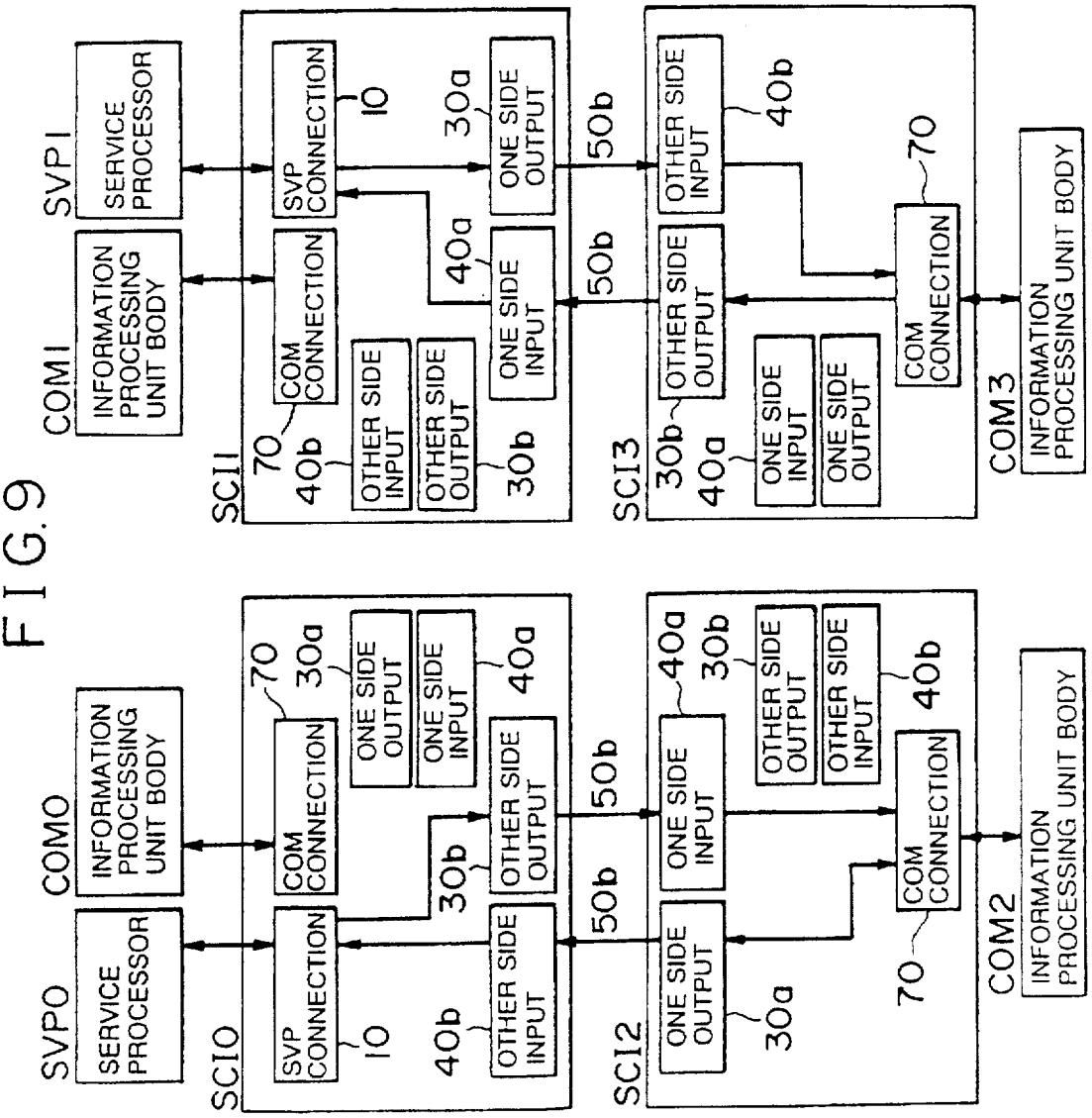

FIG. 8 is a chart showing a flow of the signal in the example 1 of the embodiment; and, FIG. 9 is a chart showing a flow of the signal in the example 2 of the embodiment.

DETAILED DESCRIPTION OF THE PREFERRED EMBODIMENT

The preferred embodiment of the present invention will be described referring to the drawings. This preferred embodiment is carried out in an information processing system connected by a plurality of bus and consisting of a service processor SVP, a system console interface control unit SCI and an information processing unit body COM.

Figure 1:
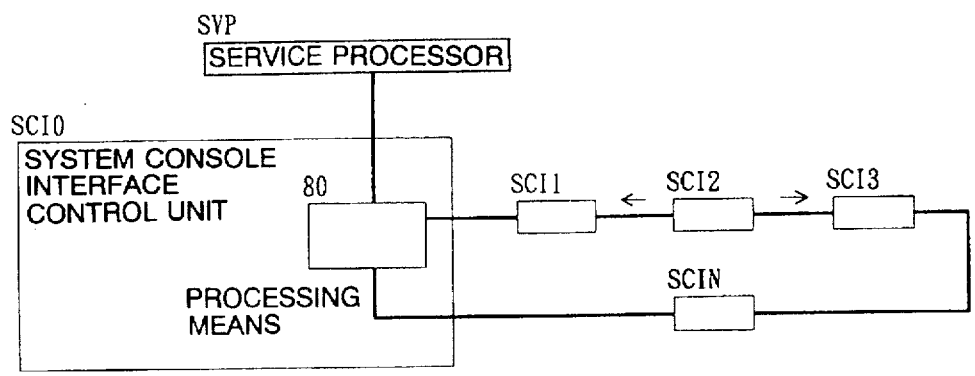
FIG. 1 is a principle chart 1 of the present invention.
Figure 2:
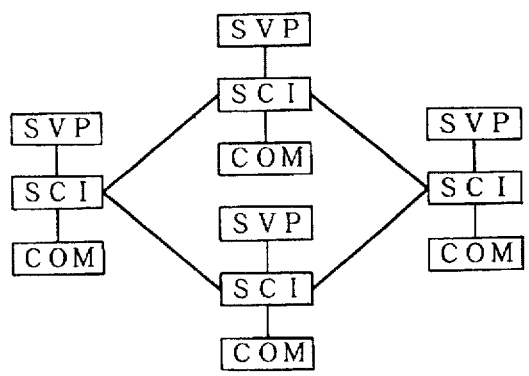
FIG. 2 is a principle chart 2 of the present invention.
Figure 3:
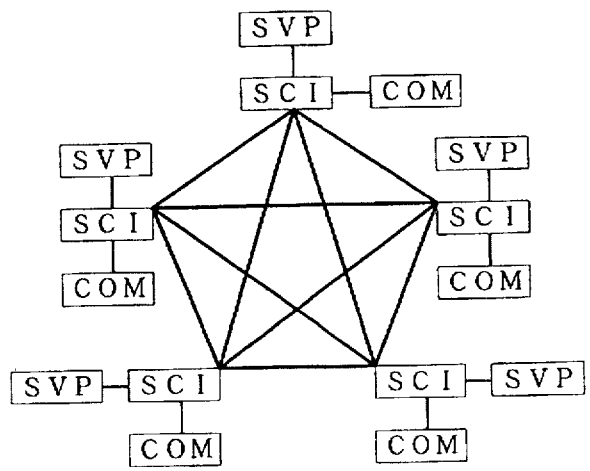
FIG. 3 represents an example of connection by conventional point-to-point connection method.

Referring to FIG. 1 showing a principle chart of the present invention, each system console interface control units SCI is connected to each other in a ring fashion. Also the system console interface control unit SCI has a processing means 80 for processing interface between the service processor SVP and an other information processing unit body COM. This processing means 80 could have a process output means 80a, a process input means 80b and a process relay means 80c described as follows.

The process output means 80a receives an access processing order for the information processing unit body COM in an other unit from the service processor SVP in a self-unit and requests a bus-use to two transmission directions, i.e., logical one side and an other side. The processing output means 80a then proceeds the access processing through the transmission direction which first permits the bus-use.

The process input means 80b receives an access processing order for the information processing unit body in the self-unit at least from either the logical one side or the logical other side and proceeds the access processing through the transmission direction from which the access process order is transmitted.

The process relay means 80c receives an access process order for the information processing unit body in the other unit at least from either the logical one side or the logical other side and requests the bus-use to the direction logically opposite to the direction from which the access processing order is transmitted. The process relay means 80c then relays the access processing when the bus-use is permitted.

The process input means 80b also can be configured as follows.

(1) A certain identification number is given to the system console interface control unit SCI and the priority order between the system console interface control units based on this identification number is determined. Then, when an access processing order is received simultaneously from two directions, i.e., the logical one side and the logical other side, the access processing order transmitted from the system console interface control unit SCI having the higher priority is processed prior to the others.

(2) When the access processing order is received from two transmission direction, i.e., the logical one side and the logical other side simultaneously, the access processing order from the logical transmission direction has the priority to be processed.

(3) When the access processing order is received from two transmission direction, i.e., the logical one side and the logical other side simultaneously, the access processing order from the logical other transmission direction is processed prior to the others.

In the configuration described above, the processing means 80, the process output means 80a, the process input means 80b and the process relay means 80c consist of a central processing unit (CPU), a microprocessor or the like. The service processor SVP may consist of a personal computer, WS (Work Station) or the like. The information processing unit body COM may consist of the central processing unit, a large scale computer storing a memory or the like, or a super computer.

The logical one side and the logical other side in the present invention will be described referring to FIG. 4. The logical one side indicates a transmission direction from SCI0 to SCI1 and from SCI1 to SCI0 when the system console interface control unit SCI1 is logically connected to the system console interface control unit SCI0.

The logical other side indicates a transmission direction from SCI0 to SCI2 and from SCI2 to SCI0 when the system console interface control unit SCI1 is logically connected to the system console interface control unit SCI2. However,.in this case, SCI1 should be different from SCI2.

According to the present invention, the processing means 80 processes the interface between the service processor SVP and the information processing unit body COM in the other unit.

The following effects will be acquired if the processing means 80 includes the process output means 80a, the processing input means 80b and the process relay means 80c.

When an access processing order for the information processing unit body COM in the other unit is received from the service processor in the same unit, the bus use is requested to two transmission directions, i.e., the logical one side and the logical other side and the access processing is proceeded through the transmission direction which first permits the bus use.

When an access processing order for the information processing control unit body COM in the other unit is received at least from the either transmission direction, i.e., the logical one side or the logical other side, the access processing is proceeded through the transmission direction from which the access processing is transmitted.

When an access processing order for the information processing control unit body COM is received at least from the either transmission direction, i.e., the logical one side or the logical other side, the bus use is requested to the direction logically opposite to the direction from which the access processing order is transmitted and the access processing is relayed when the use of the bus is permitted.

Figure 4A:
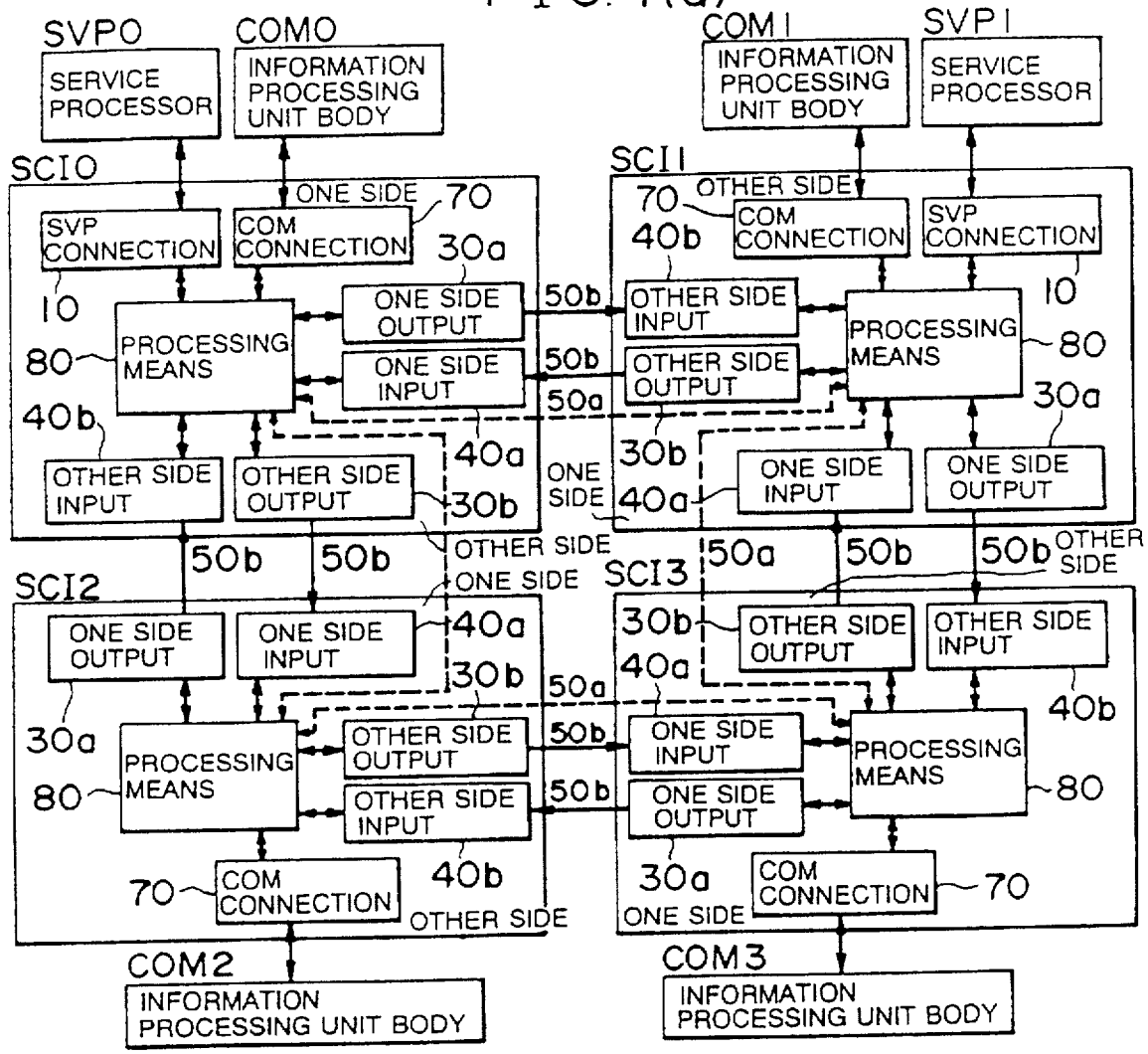
Figure 4B:
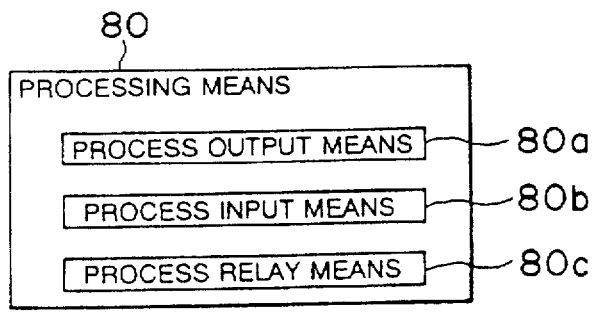

FIG. 4 shows an information processing system. This system consists of two system console interface control units SCI0, SCI1 connected to a service processor SVP and a body unit COM, two system console interface control units SCI2, SCI3 connected to a body unit COM and a ring shaped bus 50 for connecting four system console interface control unit SCI0~3 to each other. Such a system is used, for example, for database retrieval or the like.

As shown in FIG. 4, the system console interface control unit SCI0~3 respectively consists of (1) SVP connection 10, (2) COM connection 70, (3) one side input 40a, (4) other side input 40b, (5) one side output 30a, (6) other side output 30b, (7) process output means 80a, (8) process input means 80b and (9) process relay means 80c.

In this embodiment, the bus 50 consists of a control bus 50a and a data bus 50b.

Each part in the system console interface control unit SCI will be described in detail.

(1) SVP connection 10

SVP connection 10 connects a service processor SVP such that the service processor SVP can input and output through an interface unit.

(2) COM connection 70

COM connection 70 connects an information processing unit body COM such that the information processing unit body COM can input and output through the interface unit.

(3) One side input 40a

One side input 40a inputs a transmission data from logical one side through a data bus 50b.

(4) Other side input 40b

An other side input 40b inputs the transmission data from the logical other side through the data bus 50b.

(5) One side output 30a

One side output 30a outputs the transmission data to the logical side through the data bus 50b.

(6) Other side output 30b

An other side output 30b outputs the transmission data to the logical other direction through the data bus 50b.

(7) Process output means 80a

As shown in FIG. 5, a process output means 80a waits until an access processing order signal is inputted into SVP connection 10 of the system console interface control unit SCI (SCI0) of the self information processing unit through the bus 50 (Step 501). The access processing order signal is outputted from the service processor SVP (SVP0), which is connected to the system console interface control unit SCI (SCI0) of the information processing unit, for the body unit COM connected the system console interface control unit SCI (SCI1 or SCI2) of other information processing unit. When the access processing order signal is inputted in to SVP connection 10 at the step 501, a bus use request is outputted to the logical side and the logical other side through a control bus 50a to acquire the authority for the use of the data bus 50b (Step 502).

The process output means 80a then waits until a bus use permission is outputted (Step 503a). When the permission is outputted, the process is determined according to the outputted direction (Step 503b).

If the direction outputted at the step 502 is the logical one side, an output from the SVP connection 10 is inputted to the direction output 30a (Step 504a) and an output from the other side 40b is inputted to the SVP connection (Step 504b).

If the direction outputted at the step 502 is the logical other side, the output from the SVP connection 10 is inputted to the other side output 30b (Step 505a) and an output from the one side 40a is inputted to the SVP connection (Step 505b).

Finally, when an access processing end request signal is inputted (Step 506a), a bus use request signal output is stopped (Step 506b) and the process output means 80a goes back to the step 501.

(8) Process input means 80b

A process input means 80b, as shown in FIG. 6, waits until an access processing order is inputted into. The access processing order is outputted from the service processor SVP, which is connected to the system console interface control unit SCI of the other information processing unit, and is inputted into the process input means 80b from either transmission direction, i.e., the logical one side or the logical other side for the information processing unit body COM connected to a system console interface control unit SCI (Step 601).

When the access processing order is inputted into the process input means 80b at the step 601, the process is determined according to the condition of the body unit COM connected to COM connection 70 of the system console interface control unit SCI of itself (Step 602).

If the body unit COM is occupied at the step 602, the access processing order is canceled (Step 603) and the process input means 80b goes back to the step 601.

If the body unit COM is not occupied at the step 602, the bus use permission signal is outputted to the direction from which the access process request signal is outputted (Step 604).

The process is determined according to the direction from which the access processing order signal is transmitted (Step 605).

If the direction from which the access processing order signal is transmitted at the step 605 is the logical one side, an output from the one side input 40a is inputted to the SVP connection 10 and the COM connection 70 (Step 606a) and an output from the COM connection 70 is inputted to the one side output 30a (Step 606b).

If the direction from which the access processing order signal is transmitted at the step 605 is the logical other side, an output from the other side input 40b is inputted to the SVP connection 10 and the COM connection 70 (Step 607a) and an output from COM connection 70 is inputted to the other side output 30b (Step 607b).

If the direction from which the access processing order signal is transmitted at the step 605 is both the logical and the logical other side, the access processing order transmitted from the direction having a higher priority determined by a certain identification number (Step 608a) is selected and the unselected access processing order is canceled (Step 608b). The process is determined according to the direction from which the selected access processing order signal is transmitted (Step 609).

If the direction from which the access processing order signal is transmitted at the Step 609 is the logical one side, the output from the one side input 40a is inputted to the SVP connection 10 and the COM connection 70 (Step 610a) and the output from the COM connection 70 is inputted to the one side output 30a (Step 610b).

If the direction from which the access processing order signal is transmitted at the step 609 is the logical other side, the output from the other side input 40b is inputted to the SVP connection 10 and the COM connection 70 (Step 611a) and the output from the COM connection 70 is inputted to the other side output 30b (Step 611b).

Finally, when the access processing end signal is inputted from the control bus 50a, the process input means 80b goes back to the step 601.

(9) Process relay means 80c

As shown in FIG. 7, a process relay means 80c waits until an access processing order is inputted into. The access processing order is outputted from the service processor SVP, which is connected to the system console interface control unit SCI of the other information processing unit, and is inputted into the process input means 80c from either transmission direction, i.e., the logical one side or the other side for the information processing unit body COM connected to the other system console interface control unit SCI (Step 701). When the access processing order is inputted at the step 701, the process is determined according to the condition of the body unit COM connected to COM connection 70 of the system console interface control unit SCI of itself (Step 702).

If the body unit COM is occupied at the step 702, the access processing order is canceled (Step 703) and the process relay means 80c goes back to the step 701.

If the body unit COM is not occupied at the step 702, the bus use is requested to the direction logically opposite to the direction from which the access processing order is transmitted (Step 704a). The process relay means 80c then waits for the bus use permission (Step 704b) and the process is determined according to the direction from which the access processing order signal is transmitted when the bus use permission is outputted (Step 705).

If the direction from which the access processing order signal is transmitted at the step 705 is the logical one side, the output from the one side input 40a is inputted to the other side output 30b (Step 706).

If the direction from which the access processing order signal is transmitted at the step 705 is the logical other side, the output from the other side input 40b is inputted to the one side output 30a (Step 707).

If the direction from which the access processing order signal is transmitted at the step 705 is both the logical one side and the logical other side, the access processing order transmitted from the direction having a higher priority determined by a certain identification number (Step 708a) is selected and the unselected access processing order is canceled (Step 708b). The process is determined according to the direction from which the selected access processing order signal is transmitted (Step 709).

If the direction from which the access processing order signal is transmitted at the step 709 is the logical one side, the output from the direction input 40a is inputted to the other side output 30b (Step 710a) and the output from the other side input 40b is outputted to the direction output 30a (Step 710b).

If the direction from which the access processing order signal is transmitted at the step 709 is the logical other side, the output from the other side input 40b is inputted to the one side input 30a (Step 711a) and the output from the one side output 40a is outputted to the other side output 30b (Step 711b).

Finally, when the access processing end signal is inputted from the control bus 50a, the process relay means 80c goes back to the step 701.

Furthermore, two examples of an access control in the above mentioned configuration will be described hereinbelow.

The priority order between the system console interface control units SCI is determined as SCI0>SCI1>SCI2>SCI3.

[Example 1: An access control having two service processors which access a same body unit]

In the example 1, the access processing order (AR0) for the body unit COM 3 is issued from the service processor SVP0 as well as the access processing order (AR1) for the body unit COM 3 from the service processor SVP1 is issued and an exclusive control is necessary.

*SVP0 transmits an access processing order signal to SCI0.

*SVP1 transmits an access processing order signal to the SCI1.

*SCI0 outputs a bus use request signal BR0 to SCI1 and SCI2.

*SCI1 outputs a bus use request signal BR1 to SCI0 and SCI3.

*As the bus used request signal is transmitted between SCI0 and SCI1, a bus use permission signal for BR0 and BR1 is not outputted so that there is no logical connection between SCI0 and SCI1.

*SCI3 outputs the bus use permission signal to SCI1 side as COM3 is not occupied.

*SCI2 outputs the bus use request signal to SCI3. However, as SCI1 has already outputted the bus use request signal, the bus use request signal from SCI2 is rejected. Also if SCI1 and SCI2 outputs the bus use request signal simultaneously, the bus use request from SCI2 is rejected as SCI1 has a higher priority.

*At this point, the signal flows in the distributed system as shown in FIG. 8.

*When the access processing for COM3 from SVI1 ends, SVP1 outputs an access process end signal to SCI1 and the bus between AM1 and AM3 is released.

[Example 2: an access control having two service processors which respectively access different body units]

In example 2, the access processing order for COM2 is issued from SVP0 as well as the access processing order for COM 3 from SVP1 is issued and the respective access processing order is processed simultaneously.

*SVP0 transmits an access processing order signal to SCI0.

*SVP1 transmits an access processing order signal to SCI1.

*SCI0 outputs a bus use request signal BR0 to SCI1 and SCI2.

*SCI1 outputs a bus use request signal BR1 to SCI0 and SCI3.

*As the bus used request signal is transmitted between SCI0 and SCI1, a bus use permission signal for BR0 and BR1 is not outputted so that there is no logical connection between SCI0 and SCI1.

*SCI2 outputs the bus use permission signal to SCI0 side as COM2 is not occupied.

*SCI3 outputs the bus use permission signal to SCI1 side as COM3 is not occupied.

*At this point, the signal flows in the distributed system as shown in FIG. 9.

*When the access processing for COM2 from SVP0 ends, SVP0 outputs an access process end signal to SCI0 and the bus between SCI0 and SCI2 is released.

*When the access processing for COM3 from SVP1 ends, SVP1 outputs an access process end signal to SCI1 and the bus between SCI1 and SCI3 is released.

We claim:

1. An information processing system comprising a plurality of information processing units, each of said information processing units comprising:

an information processing unit body processing predetermined information;

a service processor servicing microprogram loading and error processing for said information processing unit body;

processing means for processing an interface between the service processor and an information processing unit body of another one of said information processing units or for processing an interface between said information processing unit body and a service processor of another one of said information processing units; and a system console interface control unit connecting said information processing unit body of one of said information processing units with the service processor of the another one information processing unit, said system console interface control unit being connected in a ring fashion to system console interface control units of other information processing units by a bus, said processing means including processing output means for receiving an access processing order for the information processing unit body of the another one information processing unit from said service processor, for transmitting a request of a bus-use to two transmission directions of a logical one side of the bus and the other side of the bus, and for proceeding an access processing by the transmission direction which first permits a bus-use;

processing input means for receiving the access processing order for said information processing unit body which is transmitted through the logical one direction or the other direction from the service processor of the another one information processing unit, for transmitting a permission of said bus-use to the transmission direction from which said access processing order is transmitted when said information processing unit body is not occupied, and for proceeding said access processing by the transmission direction; and processing relay means for receiving said access processing order for the information processing unit body of the another one information processing unit which is transmitted through the logical one direction or the other direction from said service processor of the another one information processing unit, for transmitting a request of said bus-use to a transmission direction logically opposite to the transmission direction from which said access processing order is transmitted, and for relaying to process said access processing from the another one information processing unit to the one information processing unit when said processing relay means receives a permission of said bus-use.

2. An information processing system claimed in claim 1, wherein said system console interface control unit is given a certain identification number to determine a priority order between one and the other system console interface control units based on said identification number so that said processing input means gives priority to the access processing order transmitted from the system console interface control unit having a higher priority when simultaneously receiving said access processing order from two directions of the logical one side of the bus and the other side of the bus.

3. An information processing system claimed in claim 1, wherein said processing input means gives priority to the access processing order transmitted from the logical one side of the bus when simultaneously receiving said access processing order from two transmission directions of the logical one side of the bus and the other side of the bus.

4. An information processing system claimed in claim 1, wherein said processing input means gives priority to the access processing order transmitted from the logical other side of the bus when simultaneously receiving said access processing order from two transmission directions of the logical one side of the bus and the other side of the bus.

* * * * *